US009571879B2

(12) United States Patent
Dang et al.

(10) Patent No.: US 9,571,879 B2
(45) Date of Patent: Feb. 14, 2017

(54) CONSUMPTION OF CONTENT WITH REACTIONS OF AN INDIVIDUAL

(75) Inventors: Yingnong Dang, Beijing (CN); Sergio Paolantonio, Beijing (CN); Xiang Cao, Beijing (CH); Xiumin Lin, Hangzhou (CH); Dongmei Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 192 days.

(21) Appl. No.: 13/347,546

(22) Filed: Jan. 10, 2012

(65) Prior Publication Data

US 2013/0179911 A1 Jul. 11, 2013

(51) Int. Cl.
| | |
|---|---|
| H04H 60/56 | (2008.01) |
| H04N 21/4223 | (2011.01) |
| H04N 21/422 | (2011.01) |
| H04N 21/44 | (2011.01) |
| H04N 21/4788 | (2011.01) |
| H04N 21/431 | (2011.01) |
| G06F 3/01 | (2006.01) |

(Continued)

(52) U.S. Cl.
CPC .......... *H04N 21/4223* (2013.01); *G06F 3/017* (2013.01); *G06F 3/0304* (2013.01); *H04N 21/42201* (2013.01); *H04N 21/4316* (2013.01); *H04N 21/44008* (2013.01); *H04N 21/4788* (2013.01); *G06F 2203/011* (2013.01); *H04N 7/157* (2013.01)

(58) Field of Classification Search
CPC ........ H04N 60/33; H04N 60/45; H04N 30/02; H04N 60/43; H04N 7/163

USPC ....... 348/14.01–14.12; 725/10, 12, 133, 141, 725/152
See application file for complete search history.

(56) References Cited

U.S. PATENT DOCUMENTS

| 6,585,521 B1 | 7/2003 | Obrador |
| 7,889,073 B2 | 2/2011 | Zalewski |

(Continued)

FOREIGN PATENT DOCUMENTS

| CN | 1658193 A | 8/2005 |
| JP | 2005142975 | 6/2005 |

(Continued)

OTHER PUBLICATIONS

Adams, et al., "Distributed Research Teams: Meeting Asynchronously in Virtual Space", Retrieved at <<http://onlinelibrary.wiley.com/doi/10.1111/j.1083-6101.1999.tb00108.x/full>>, Proceedings of the 32nd Hawaii International Conference on System Sciences, Jan. 5-8, 1999, 23 pages.

(Continued)

*Primary Examiner* — Jason Salce
(74) *Attorney, Agent, or Firm* — Sandy Swain; Micky Minhas (57) ABSTRACT

Techniques for obtaining a reaction of an individual to content and outputting the reaction of the individual with the content are described herein. The techniques may include obtaining the reaction of the individual as the content is displayed to the individual. The reaction may be obtained by capturing a video of the individual. The reaction of the individual and the content may be output at a same time to another individual. These techniques may also include obtaining the reaction of another individual as the content and the reaction of the individual are output to another individual.

20 Claims, 7 Drawing Sheets

(51) Int. Cl.
*G06F 3/03* (2006.01)
*H04N 7/15* (2006.01)

(56) References Cited

U.S. PATENT DOCUMENTS

| | | | |
|---|---|---|---|
| 2003/0093784 A1* | 5/2003 | Dimitrova | H04N 7/163 725/10 |
| 2003/0165270 A1 | 9/2003 | Endrikhovski et al. | |
| 2005/0179785 A1* | 8/2005 | Shingu et al. | 348/211.3 |
| 2005/0210393 A1 | 9/2005 | Maeng | |
| 2006/0020966 A1* | 1/2006 | Poslinski | 725/37 |
| 2007/0005812 A1 | 1/2007 | Moore | |
| 2007/0203426 A1 | 8/2007 | Kover et al. | |
| 2008/0043089 A1* | 2/2008 | Auerbach et al. | 348/14.1 |
| 2008/0059994 A1 | 3/2008 | Thornton et al. | |
| 2008/0184122 A1 | 7/2008 | Grant et al. | |
| 2008/0320080 A1* | 12/2008 | Lee et al. | 709/204 |
| 2009/0052645 A1* | 2/2009 | Bansal et al. | 379/202.01 |
| 2009/0183220 A1* | 7/2009 | Amento et al. | 725/120 |
| 2009/0217315 A1* | 8/2009 | Malik et al. | 725/9 |
| 2009/0307189 A1 | 12/2009 | Bobbitt et al. | |
| 2009/0327425 A1 | 12/2009 | Gudipaty | |
| 2010/0070987 A1* | 3/2010 | Amento | H04H 60/33 725/10 |
| 2010/0100594 A1 | 4/2010 | Frees et al. | |
| 2011/0134026 A1 | 6/2011 | Kang et al. | |
| 2011/0273526 A1 | 11/2011 | Mehin et al. | |
| 2011/0292162 A1* | 12/2011 | Byun et al. | 348/14.08 |
| 2012/0072939 A1* | 3/2012 | Crenshaw | H04H 60/33 725/12 |
| 2012/0093486 A1* | 4/2012 | Tsurumi | 386/279 |
| 2012/0167839 A1* | 7/2012 | Wepfer et al. | 122/510 |
| 2012/0212508 A1* | 8/2012 | Kimball | 345/633 |
| 2012/0229587 A1* | 9/2012 | Sampathkumaran et al. | 348/14.03 |
| 2012/0262535 A1* | 10/2012 | Gratton et al. | 348/14.07 |
| 2012/0262582 A1* | 10/2012 | Kimchi et al. | 348/159 |
| 2012/0296972 A1* | 11/2012 | Backer | 709/204 |
| 2013/0042276 A1* | 2/2013 | Payette et al. | 725/62 |
| 2013/0128058 A1* | 5/2013 | Sagayaraj et al. | 348/207.1 |

FOREIGN PATENT DOCUMENTS

| | | |
|---|---|---|
| JP | 2008136210 | 6/2008 |
| KR | 1020060021544 | 9/2007 |
| KR | 20090121016 | 11/2009 |

OTHER PUBLICATIONS

U.S. Appl. No. 13/159,201, filed Jun. 13, 2001, pp. 28, "Asynchronous Video Threads".

U.S. Appl. No. 13/304,371; "Proxy for Asynchronous Meeting Participation" Inventor John Tang; filed Nov. 24, 2011; 32 pages.

Lachut, Scott, "The Next Step in Social Media: Asynchronous Video Conversations", Retrieved at <<http://www.psfk.com/2011/01/the-next-step-in-social-media-asynchronous-video-conversations.html>>, Jan. 11, 2011, pp. 9.

Watt, et al., "Asynchronous Videoconferencing: A Hybrid Communication Prototype", Retrieved at <<http://coms.uconn.edu/directory/faculty/HCILab/publications/Watt.Walther.Nowak-2002-HICSS.pdf>>, Proceedings of the 35th Hawaii International Conference on System Sciences, Jan. 7-10, 2002, pp. 1-9.

Ravaja, et al., Emotional Response Patterns and Sense of Presence during Video Games: Potential Criterion Variables for Game Design, Proceedings of the third Nordic conference on Human-computer interaction, pp. 339-347, 2004.

Family Story Play: Reading with Young Children (and Elmo) Over a Distance, CHI 2010, 10 pages, <<http://research.nokia.com/files/FamilyStoryPlayCHI10.pdf>>.

Ames, et al., Making Love in the Network Closet: The Benefits and Work of Family Videochat, Proceedings of the 2010 ACM Conference on Computer Supported Cooperative Work, pp. 145-154, 2010, <<http://www.stanford.edu/~morganya/research/ames-cscw10-videochat.pdf>>.

Ravaja, et al., Phasic Emotional Reactions to Video Game Events: A Psychophysiological Investigation, Proceedings of Media Psychology, 2006, pp. 343-367, <<http://www-user.tu-chemnitz.de/~pida/phasic%20emotional%20reactions%20to%20video%20game%20events%20-%20a%20psychophysiological%20investigation.pdf>>.

Real-time Emotion Tracking Exposes the Honest Truth About Audience Reactions, Vision Critical, Apr. 21, 2011, 2 pages, <<http://www.visioncritical.com/wp-content/uploads/2011/04/2011-04-21_ReactionPlus_Debates1.pdf>>.

Robinson, Video User Interfaces, VISAPP 2006—Proceedings of the First International Conference on Computer Vision Theory and Applications, 2 vols. 2006, Setubal, Portugal, pp. 1-10.

PCT Search Report for PCT Application No. PCT/US2013/020709, mailed Apr. 24, 2013 (11 pages).

The European Search Report mailed Jan. 5, 2015 for European patent application No. 13736131.7, 3 pages.

The European Office Action mailed Jan. 29, 2015 for European patent application No. 13736131.7, a counterpart foreign application of U.S. Appl. No. 13/347,546, 6 pages.

PCT International Preliminary Report on Patentability for PCT Application No. PCT/US2013/020709, mailed Jul. 24, 2014 (8 pages).

Non-Final Office Action for U.S. Appl. No. 13/304,371, mailed on May 8, 2015, Hoff et al., "Proxy for Asynchronous Meeting Participation", 17 pages.

Final Office Action for U.S. Appl. No. 13/304,371, mailed on Sep. 11, 2015, Hoff et al., "Proxy for Asynchronous Meeting Participation", 17 pages.

Translated Chinese Office Action mailed Apr. 5, 2016 for Chinese Patent Application No. 201380004911.5, a counterpart foreign application of U.S. Appl. No. 13/347,546, 13 pages.

* cited by examiner

CONSUMPTION OF CONTENT WITH REACTIONS OF AN INDIVIDUAL

BACKGROUND

A large and growing number of individuals consume content, such as videos, music, images, electronic text, etc. These individuals often interact with the content by, for example, providing a comment to the content and/or recommending the content to another individual. While these approaches may provide some interaction with the content, there is an increasing opportunity to consume content in an interactive manner.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure is directed to, in part, obtaining a reaction of an individual to content and providing the reaction and the content to be output at a same time. The reaction of the individual may be obtained by capturing video of the individual, capturing audio of the individual, and/or monitoring a physical response of the individual to the content while the content is output. In some instances, the reaction of the individual is associated with the content, with the individual's explicit knowledge and consent. For example, the reaction of the individual may be stored as metadata associated with the content and/or may be stored with the content on one or more servers.

Thereafter, the reaction of the individual and the content may be provided to be output to one or more individuals. For example, the reaction of the individual and the content may be output (e.g., displayed) at a same time to another individual. As the reaction of the individual and the content are output, a reaction of another individual may be obtained. For instance, the reaction of another individual may be obtained by capturing video or audio of another individual while another individual views the reaction of the individual and the content. The reaction of the other individual may then be similarly output. That is, the reaction of another individual and the content may be output (e.g., displayed) at a same time to yet another individual. In some cases, the content may be output at a same time as the reaction of the individual and the reaction of the other individual(s). By implementing these techniques, individuals are not only to view certain content, but also able to view other individuals' reactions to this content, which adds to the individuals' overall viewing experience.

This brief introduction, including section titles and corresponding summaries, is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Overview

Figure 1:
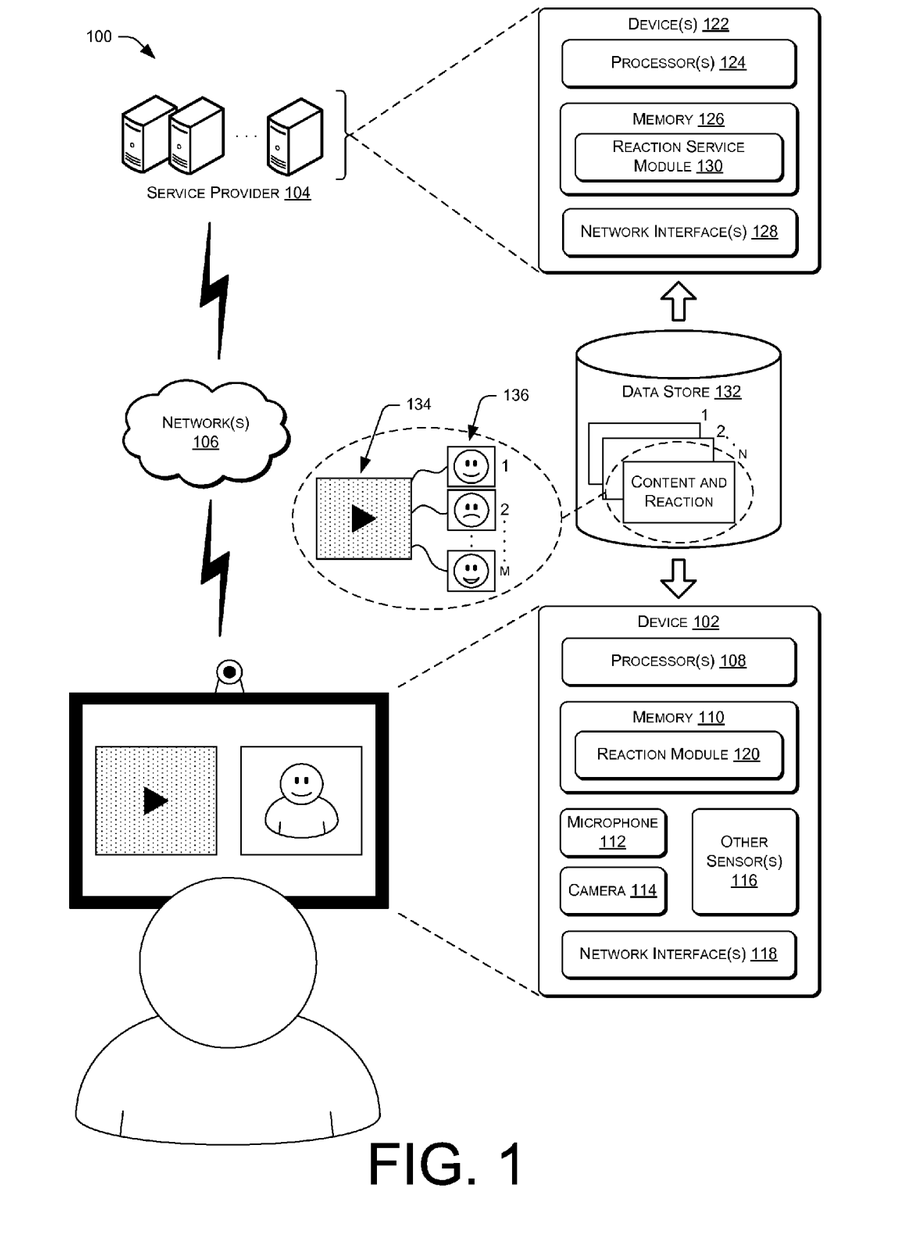
FIG. 1 illustrates an example architecture to obtain reactions of one or more individuals to content viewed by these individuals and to provide the reactions along with the content when showing the content to one or more other individuals.

FIG. 1 illustrates an example architecture 100 to obtain reactions of one or more individuals to content and to provide the reactions along with the content. Here, techniques are described in the context of a device 102 to communicate with a service provider 104 over a network(s) 106. For example, the device 102 may communicate with the service provider 104 to obtain and/or provide content and/or reactions of one or more individuals to the content.

In the architecture 100, the device 102 may comprise any combination of hardware and/or software resources configured to process data. The device 102 may be implemented as any number of computing devices including, for example, a personal computer, a laptop computer, a cell phone, a tablet device, a personal digital assistant (PDA), etc. The device 102 is equipped with one or more processors 108, memory 110, a microphone 112, a camera 114, other sensor(s) 116, and a network interface(s) 118. The camera 114 may comprise, for example, a video camera, web camera, digital still camera, etc. The other sensor(s) 116 may include, for example, a heart rate monitor, a blood pressure monitor, gaze tracking equipment, etc.

The memory 110 may be configured to store applications and data. An application, such as a reaction module 120, running on the device 102 may perform operations for obtaining reactions of one or more individuals to content and/or providing the reactions along with the content to be output at a same time. As discussed in further detail below, the reaction module 120 may perform one or more operations in cooperation with the service provider 104.

Although the memory 110 is depicted in FIG. 1 as a single unit, the memory 110 (and all other memory described herein) may include one or a combination of computer readable media. Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

In the example of FIG. 1, the device 102 communicates with the service provider 104 via the network(s) 106. Network(s) 106 may include any one or combination of multiple different types of networks, such as cellular networks, wireless networks, local area networks, and the Internet. Meanwhile, the service provider 104 may be hosted on one or more device(s) 122 having processing and storage capabilities. The device(s) 122 may be implemented as any number of devices, including, for example, one or more servers, a personal computer, or a laptop computer. In one example, the device(s) 122 includes one or more servers in a data center or cloud computing environment. The device(s) 122 is equipped with a processor(s) 124, memory 126, and a network interface(s) 128.

The memory 126 may be configured to store applications and data. An application, such as a reaction service module 130, running on the device(s) 122 may perform operations for obtaining and/or providing the content and/or the reactions to the content. In some cases, the reaction service module 130 is implemented as a remote resource to the device 102, such as in a cloud-computing environment. Here, the reaction service module 130 may perform the operations for providing content to the device 102, receiving a reaction of an individual from the device 102, associating the content and the reaction, and/or providing the reaction and/or the content to the device 102 or another device. In these cases, the device 102 may perform operations for outputting the content and/or reactions (e.g., displaying the content and/or reaction) and obtaining the reaction of the individual (e.g., capturing the reaction of the individual).

Meanwhile, in other cases, the device 102 may perform operations locally for obtaining and/or providing the content and/or reactions to the content. For example, the reaction module 120 of the device 102 may perform operations for outputting content to an individual, obtaining a reaction of the individual to the content, associating the reaction of the individual with the content, and/or outputting the reaction and the content to the individual and/or other individuals. While techniques described herein are illustrated in many instances as implemented by the device 102, these techniques may be similarly implemented by, or in cooperation with, the service provider 104.

The architecture 100 also includes a data store 132 which stores content 134 and reactions to the content 136. The content 134 may include, for example, video, audio, digital text, images, etc. The content may be previously generated by the device 102, the service provider 104, and/or another device. As illustrated in FIG. 1, the content 134 may be associated with one or more reactions 136 to the content 134. The reactions 136 may be associated with the content 134 by utilizing generally known techniques. These techniques may include, for example, storing the reactions 136 as metadata for the content 134, storing the content 134 as metadata for the reactions 136, storing the reactions 136 and the content 134 together at a same location in memory, storing data indicating a correlation between the reactions 136 and the content 134, etc.

The reactions 136 may generally comprise one or more observable actions of one or more individuals to the content 134. For example, the reactions 136 may include facial expressions (e.g., a smile, frown, etc.), body movement (e.g., a head motion, arm motion, eye movement, etc.), sounds (e.g., a laugh, yell, cry, speech, etc.), a nerve response, a heart rate (e.g., increase or decrease of the heart rate), blood pressure (e.g., increase or decrease of the blood pressure), and so forth. In some instances, the reactions 136 may alternatively, or additionally, include a response of the one or more individuals, such as the one or more individuals aiming a video camera at an object, another individual, and/or a pet. In these instances, the reactions 136 may include a reaction of the other individual and/or pet.

The reactions 136 may be obtained by capturing an image, capturing a sequence of images, capturing video of the one or more individuals, capturing audio of the one or more individuals, obtaining textual input, and/or monitoring physical movement, a nerve response, a heart rate, and/or blood pressure. The reactions 136 may be obtained via equipment, such as a video camera, a microphone, an eye tracking device, a heart rate monitor, a blood pressure monitor, etc. Although many aspects of this disclosure describe reactions obtained in the form of a video, the reactions may additionally, or alternatively, be obtained in the form of audio, image, text, and/or other data generated through monitoring physical movement, a nerve response, a heart rate, and/or blood pressure.

The reactions 136 are obtained with an individual's explicit knowledge and consent. In some cases, a notification is presented to the individual before a reaction is obtained. The notification may request authorization from the individual to obtain a reaction of the individual as the individual consumes the content. In addition, the notification may request authorization from the individual to associate the reaction with the content and/or to output the reaction with the content. By doing so, the individual may provide authorization to obtain and/or use a reaction of the individual.

In some implementations, the reactions 136 are associated with one or more avatars (e.g., characters) that may be utilized to output the reactions 136. Here, the reactions 136 may be converted to be implemented by the one or more avatars which are output (e.g., displayed) along with the content. That is, an avatar may be configured to output a reaction of an individual such that the avatar expresses a same or similar reaction as the reaction of the individual. The avatar may express, for example, a same or similar facial expression, body movement, and/or sound that is captured in the reaction of the individual. In some instances, this may allow a reaction of the individual to be output without outputting an appearance and/or identity of the individual. Although many aspects of this disclosure describe reactions of an individual that are output without utilizing an avatar, the reactions may alternatively, or additionally, be output through the avatar by, for example, displaying the avatar with animations that correspond to the reactions of the individual.

The data store 132 may be located at any location accessible to the device 102, the service provider 104, and/or other devices. In some cases, the data store 132 is located in the memory 110 of device 102. While in other cases the data store 132 is located in the memory 126 of the device(s) 122 or on other content-provider devices. Although the data store 132 is illustrated in FIG. 1 as a single unit, the data store 132 may include two or more units located in one or more devices. For example, the data store 132 may include a first data store that stores the content 134 and a second data store that stores the reactions 136. In some implementations, the first data store is located in the device 102 while the second data store is located in the device(s) 122. In other implementations, the first data store is located in the device(s) 122 while in the second data store is located in the device 102. By doing so, the content 134 may be stored independently and/or remotely from the reactions 136.

Figure 2A:
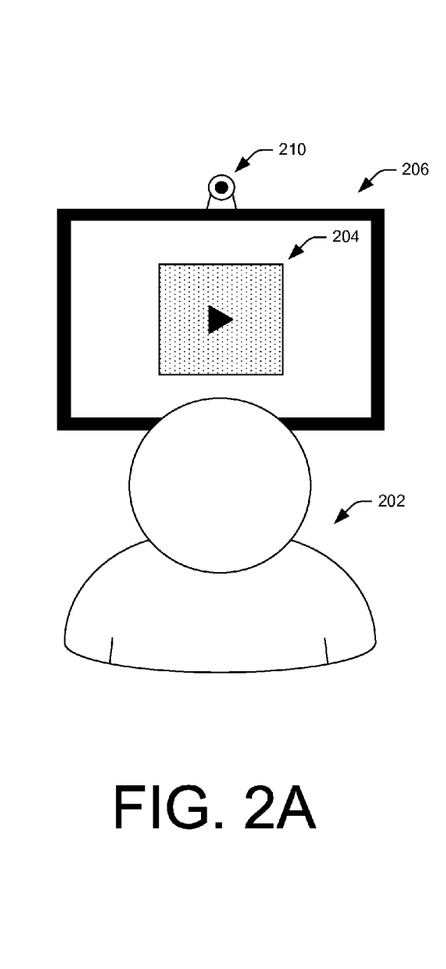
FIGS. 2A-2B illustrate an example process for obtaining a reaction of an individual to content and, sometime thereafter, outputting the content and the reaction of the individual.
Figure 2B:
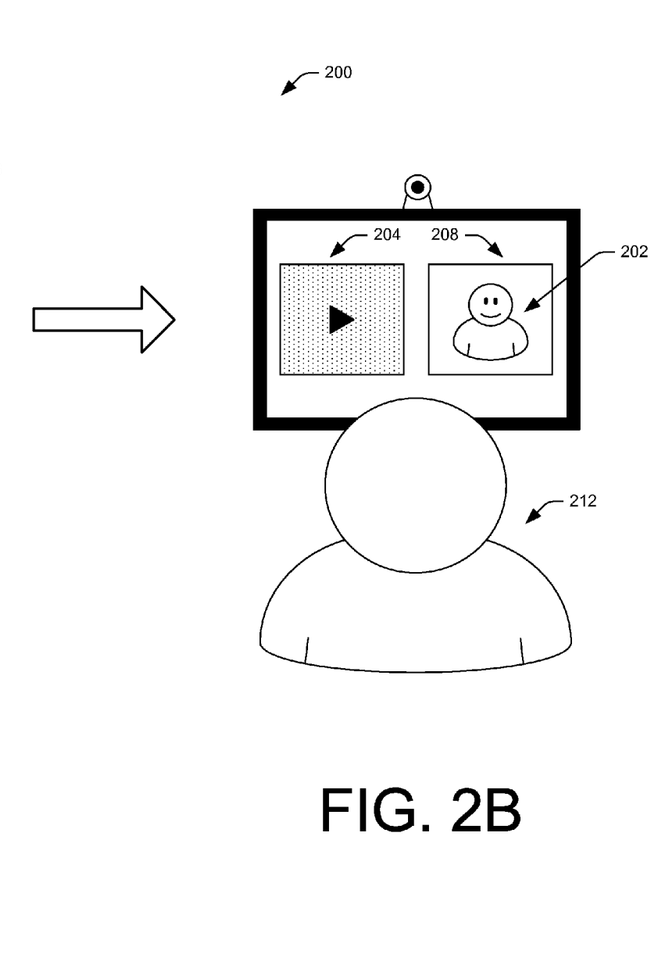

FIGS. 2A-2B illustrate an example process 200 for obtaining a reaction of an individual 202 to content 204 and outputting the content 204 and the reaction of the individual 202. The content 204 may include, for example, a video, a song, a digital image, digital text, etc. In FIG. 2A, a device 206 obtains the reaction by capturing a reaction video 208 of the individual 202 as the individual 202 consumes (e.g., views, listens to, etc.) the content 204. Here, the reaction video 208 is captured via a video camera 210 associated with the device 206. Although not illustrated, the device 206 may additionally, or alternatively, obtain the reaction by capturing audio of the individual 202, obtaining textual input, and/or monitoring physical movement, a nerve response, a heart rate, and/or blood pressure of the individual 202. The device 206 obtains the reaction with explicit knowledge and consent of the individual 202.

In FIG. 2B, the reaction video 208 of the individual 202 may be output at a same time as the content 204. The reaction video 208 and the content 204 may be output via the device 206 or another device. As illustrated, the reaction video 208 is displayed to an individual 212 on a device at a same time as the content 204. The reaction video 208 and the content 204 may be output such that the reaction video 208 is synchronized to the content 204. For example, if the individual 202 expresses a particular reaction while viewing a particular section of the content 204, then the particular reaction of the individual 202 would be displayed to the individual 212 while the individual 212 is viewing the particular section of the content 204. By doing so, the individual 212 may view the reactions of the individual 202 as the content 204 is consumed by the individual 212. Although FIG. 2B illustrates that the reaction video 208 is output to the individual 212, the reaction video 208 may alternatively, or additionally, be output to the individual 202.

In some implementations, the reaction video 208 is stored in association to the content 204 and output on one or more devices at a later time. In other implementations, the reaction video 208 and the content 204 are output in a live manner. In other words, the individual 212 may view the reaction video 208 while the device 206 captures the reaction video 208 of the individual 202. In this implementation, the content 204 may be synchronized such that the individual 202 and the individual 212 view the same portions of the content 204 at a same time. In some cases, the reaction video 208 is displayed on at least a portion of the content 204 while the content 204 is displayed.

Meanwhile, during consumption of the reaction video 208 and the content 204 by the individual 212, a device may similarly obtain a reaction of the individual 212 to the reaction video 208 and the content 204. For example, the device may capture a video of the individual 212, capture audio of the individual 212, and/or monitor physical movement, a nerve response, a heart rate, and/or blood pressure of the individual 212 as the individual 212 views the reaction video 208 and the content 204. The device obtains the reaction of the individual 212 with explicit knowledge and consent of the individual 212. The obtained reaction of the individual 212 and the content 204 may be output to another device, or the device 206, at a same time (e.g., displayed at a same time). As similarly discussed above, the reaction of the individual 212 may be synchronized to the content 204.

In some cases, the reaction of the individual 212 is viewed in a live manner by the individual 202 while the reaction video 208 of the individual 202 is viewed in a live manner by the individual 212. In these cases, the content 204 may include live content or content that is synchronized, such as a live video, video game, etc. This may allow the individual 202 and the individual 212 to view the reactions of each other in a live manner.

In some implementations, reactions to the content 204 are obtained for any number of individuals. For example, each time the content 204 is consumed by another individual, a reaction of the other individual to the content 204 may be obtained. One or more of these reactions may be output at a same time as the content 204. In some instances, at least some of the reactions are selected to be output with the content 204 based on, for example, a time when a reaction was obtained and/or personal information of an individual associated with the reaction (i.e., the individual expressing the reaction) and an individual that will consume the reaction. For example, one or more reactions may be output that are the most recent reactions that have been obtained (e.g., reactions that have been obtained during a previous period of minutes, hours, days, etc.). Additionally, or alternatively, one or more reactions may be output that are associated with personal information that is similar to the personal information of an individual that will consume the reaction. The personal information may include, for instance, a location of an individual, interests of the individual, an age of the individual, etc. The personal information is utilized with the individual's explicit knowledge and consent.

Illustrative User Interface

Figure 3:
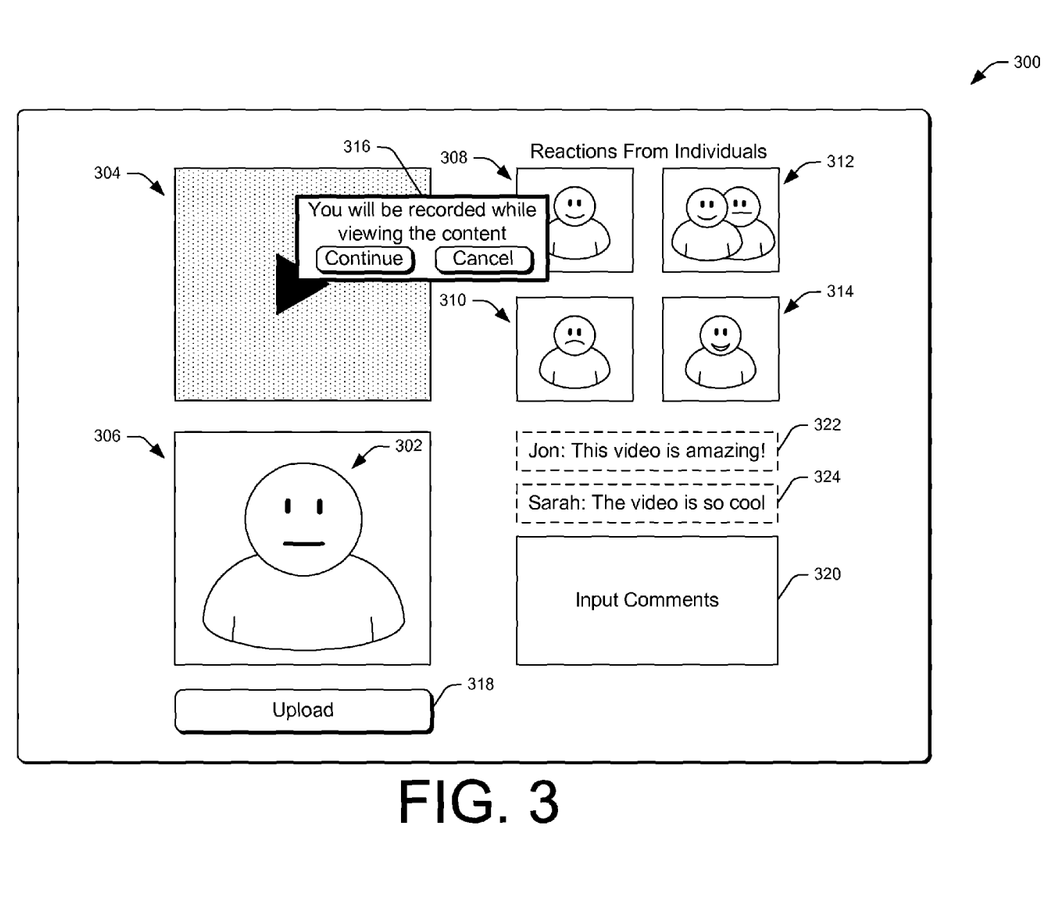
FIG. 3 illustrates an example user interface for obtaining reactions of an individual to content and/or outputting the reaction and the content at a same time.

FIG. 3 illustrates an example user interface 300 for obtaining a reaction of an individual 302 to content 304 and/or outputting the reaction and the content 304 at a same time. The user interface 300 may be displayed via, for example, a browser and/or an application. In some instances, the user interface 300 is displayed by an online site, such as an online social networking site.

The user interface 300 may allow the individual 302 to consume (e.g., view, listen to, etc.) content 304 while a video 306 of the individual 302 is captured and while the individual 302 views one or more reaction videos 308-314 of other individuals. In some instances, a notification 316 (e.g., an alert box) is presented to the individual 302 before the individual 302 begins consuming the content 304 and before the video 306 of the individual 302 is captured.

The notification 316 may request authorization from the individual 302 to obtain a reaction of the individual 302 as the individual 302 consumes content 304. As illustrated, the notification 316 may include a continue button and a cancel button to provide or deny authorization. In response to selecting the continue button, the content 304 may be output and the video 306 of the individual 302 may be captured. While in response to selecting the cancel button, the content 304 may output without capturing the video 306 of the individual 302. Although not illustrated, the notification 316 may additionally request authorization from the individual 302 to associate the reaction with the content 304 and/or to output the video 306 with the content 304 after the video 306 has been captured.

During consumption of the content 304, the individual 302 may also consume one or more of the reaction videos 308-314 of other individuals. The reaction videos 308-314 may include one or more previously recorded videos and/or one or more live videos. While the content 304 is being viewed by the individual 302, the video 306 of the individual 302 may be recorded. Upon completion of the recording, the video 306 may be uploaded via an upload button 318. The video 306 may be uploaded to for example, a service provider (e.g., service provider 104), for distribution to one or more devices upon request.

After uploading the video 306, the video 306 may be associated with the content 304 so that one or more other individuals may view the video 306 along with the content 304 in a similar manner in which the individual 302 viewed the reaction videos 308-314 along with the content 304. In some instances, the video 306 is provided in the user interface 300 for the one or more other individuals to view. The video 306 may be provided in the user interface 300 where the reaction videos 308-314 are provided.

In some implementations, the individual 302 may send a message to one or more other individuals indicating that the individual 302 has created the video 306 for the content 304. In some cases, the message includes a link to an online site to access the video 306 and the content 304. In response to selecting the link, the one or more individuals may be sent to the online site to view the video 306 along with the content 304. The one or more other individuals may be associated with an online community, such as an online social networking site. Meanwhile, the user interface 300 also includes an input field 320 to input a comment, and previous comments 322 and 324 submitted by other individuals.

Illustrative Reaction Capture

Figure 4:
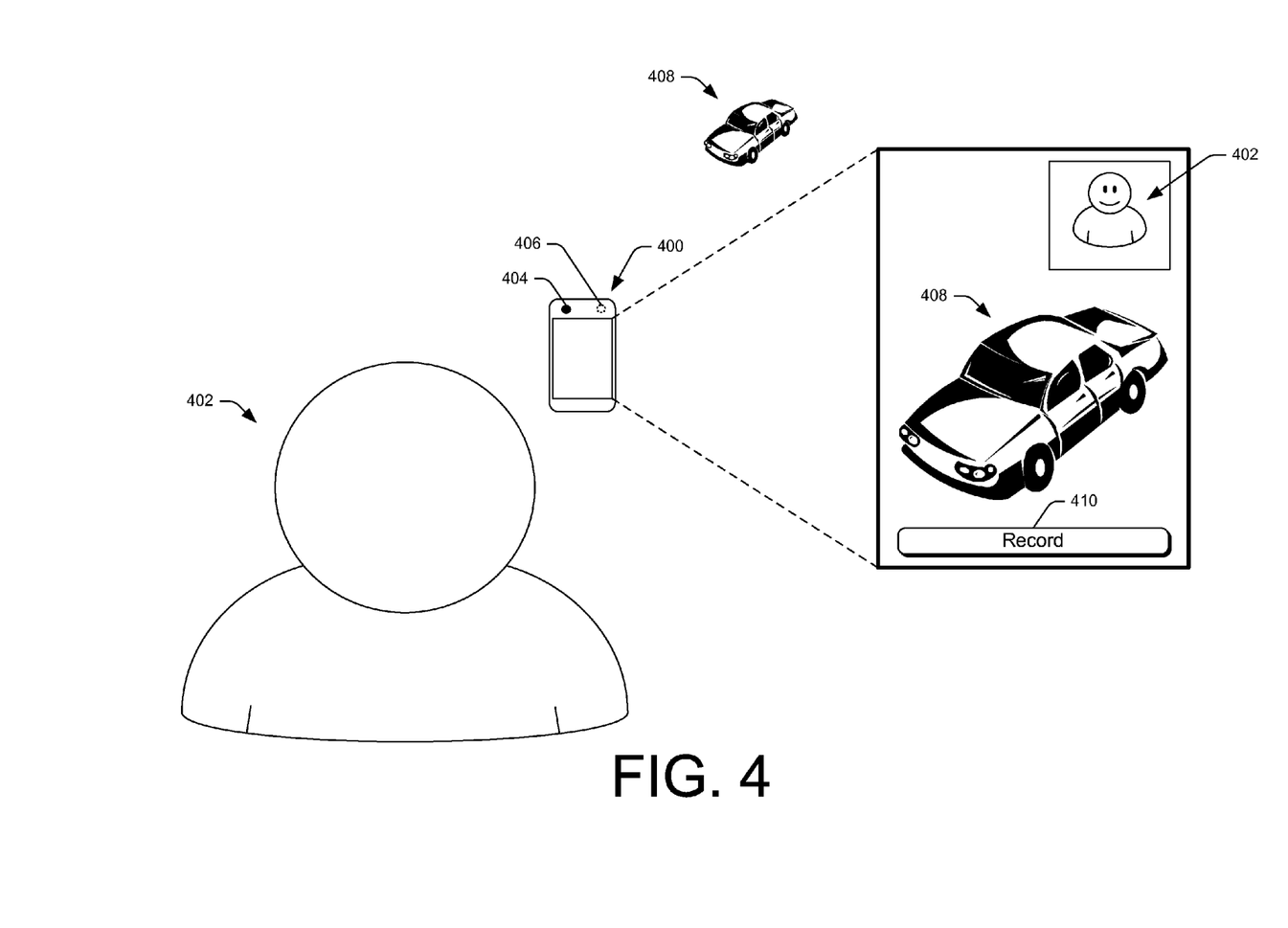
FIG. 4 illustrates an example device for capturing a reaction of an individual to certain content as the content is being captured.

FIG. 4 illustrates an example device 400 for capturing a reaction of an individual 402 as content is captured. Here, the device 400 includes a forward facing camera 404 to capture (e.g., record) a video of the individual 402 and a rear facing camera 406 to capture (e.g., record) the content. During recording, the device 400 captures a reaction of the individual 402 via the forward facing camera 404 while the content is captured via the rear facing camera 406. The reaction of the individual 402 may include a reaction to the content being captured.

In this example, the individual 402 utilizes the device 400 to capture a video of a car 408 and a reaction of the individual 402 to the car 408. For instance, if the individual is recording a video of the car 408 approaching the individual 402, then the device 400 may also record a distressed facial expression of the individual 402. Here, the device 400 may begin recording by selecting a record button 410. After recording, the video of the car 408 and the reaction of the individual 402 may be stored in association to each other and/or output to the device 400 and/or another device. The reaction of the individual 402 and the video of the car 408 may be output to a display at the same time so that an individual may view the reaction of the individual 402 to the car 408.

Illustrative Content Analysis

Figure 5:
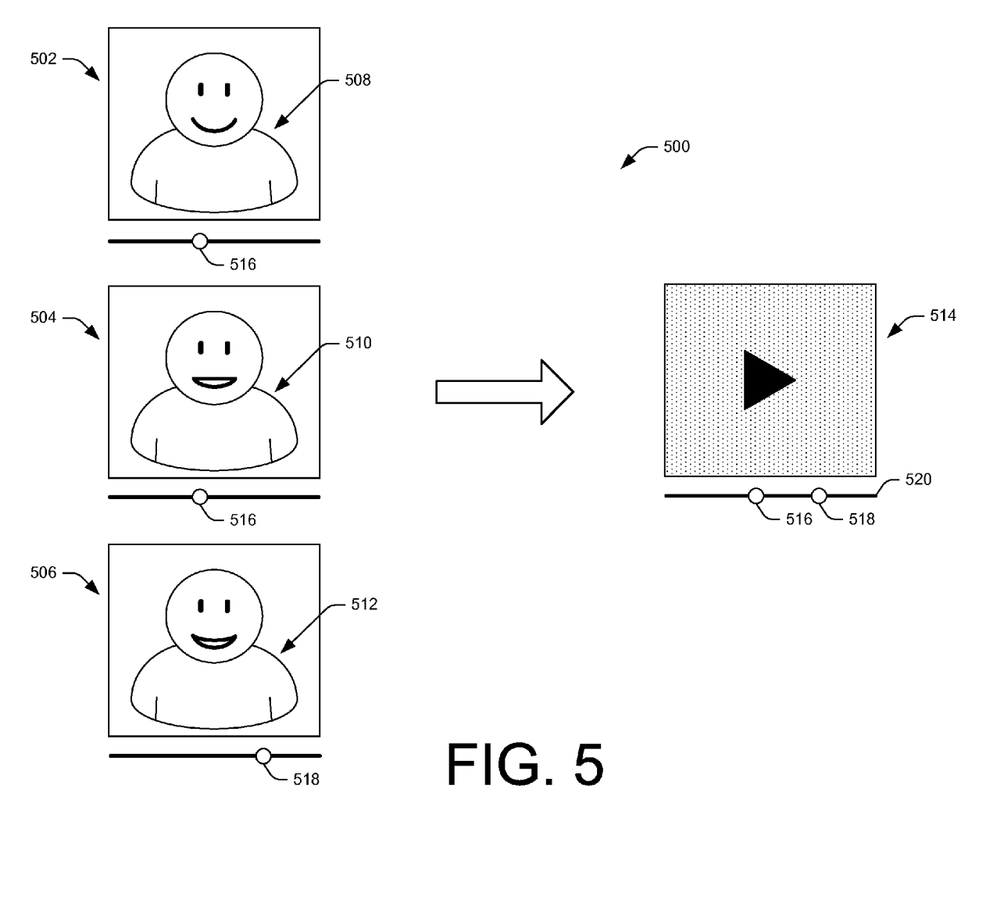
FIG. 5 illustrates an example process for determining one or more sections of content that may be output to one or more individuals.

FIG. 5 illustrates an example process 500 for determining one or more sections of content that may be output to one or more individuals. Here, the one or more sections may be determined based on one or more reactions 502-506 obtained as individuals 508-512 consumed content 514. As illustrated, the reaction 502 is obtained from the individual 508 at a time 516 associated with the content 514, the reaction 504 is obtained from the individual 510 at the time 516, and the reaction 506 is obtained from the individual 512 at a time 518. Here, the reactions 502 and 504 were obtained at a same time, time 516.

In one implementation, an analysis is performed when a reaction is obtained and associated with the content 514. The analysis may determine a section of the content 514 that corresponds to the reaction. For example, the analysis may determine that the reaction 502 is associated with the time 516 in the content 514 and select a section of the content 514 that corresponds to the time 516.

Thereafter, when another individual consumes the content 514, the selected section of the content 514 may be output to the other individual. In some instances, the selected section of the content 514 is output along with the reaction 502. By doing so, the other individual may consume a section of the content that another individual may find interesting.

In some implementations, a section of the content 514 may be selected based on more than one reaction. Here, the section of the content 514 may be selected when multiple individuals have expressed a reaction at the same time. For example, a section of the content that corresponds to the time 516 may be selected based on the reaction 502 and 504 which were obtained at the time 516.

In addition, in some implementations, a section of the content 514 may be selected when a particular type of reaction is obtained. The particular type of reaction may include, for example, a smile, a frown, a head motion, an arm motion, a laugh, a yell, a cry, etc. In some instances, the section of the content 514 is selected when a predetermined number of individuals express the particular type of reaction at the section.

In some examples, the content 514 may be presented with one or more indicators positioned at times corresponding to one or more reactions of individuals. The indicator may be similar to the circle illustrated in FIG. 5 for any of times 516 or 518. The indicator may be presented on a progress bar, such as progress bar 520. In some examples, when an individual selects one of the one or more indicators, the individual may consume a section of the content 514 corresponding to a reaction of another individual. In some instances, by presenting indicators which correspond to reactions from one or more individuals, an individual may select sections of the content 514 to consume that the one or more individuals found interesting.

Illustrative Processes

Figure 6:
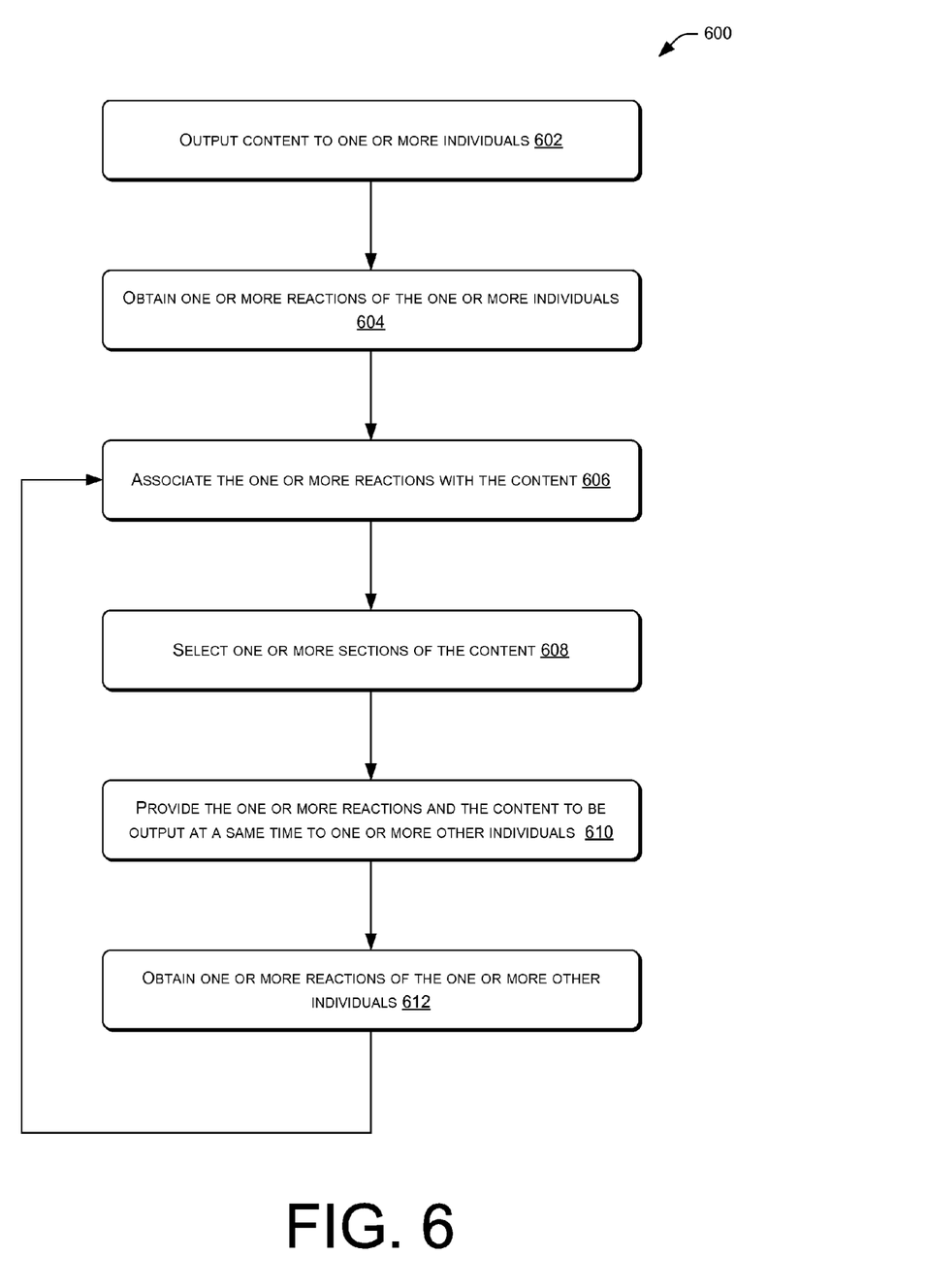
FIGS. 6-7 illustrate example processes for employing the techniques described herein.
Figure 7:
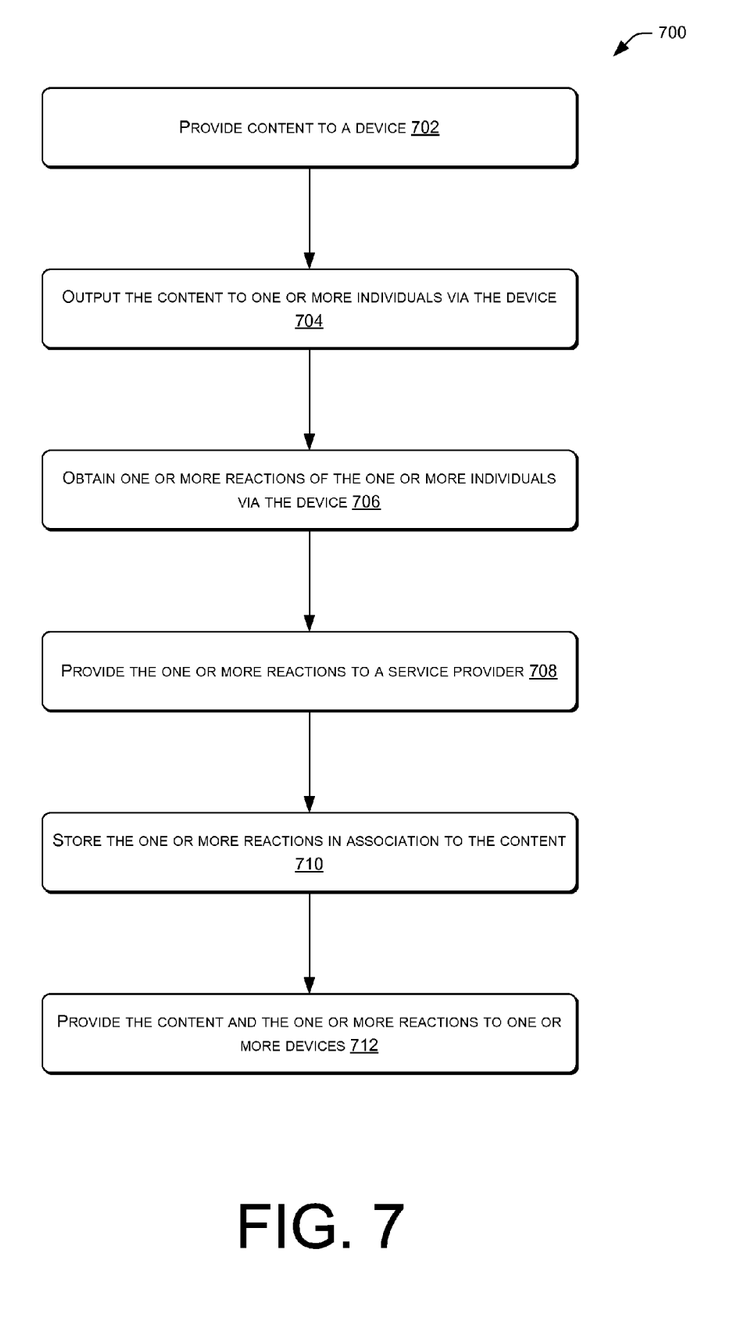

FIGS. 6-7 illustrate example processes 600 and 700 for employing the techniques described herein. For ease of illustration processes 600 and 700 are described as being performed in the architecture 100 of FIG. 1. For example, one or more of the individual operations of the processes 600 and 700 may be performed by the device 102 and/or the service provider 104. However, processes 600 and 700 may be performed in other architectures. Moreover, the architecture 100 may be used to perform other processes.

The processes 600 and 700 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In particular, FIG. 6 illustrates the process 600 for obtaining one or more reactions of one or more individuals to content as the content is output to the one or more individuals and outputting the one or more reactions along with the content. The process 600 includes an operation 602 for outputting content to one or more individuals. The content may be output via, for example, a device associated with the one or more individuals, such as the device 102 in FIG. 1. While the content is output, an operation 604 may be performed for obtaining one or more reactions of the one or more individuals. The operation 604 may include, for example, capturing a video of the one or more individuals, capturing audio of the one or more individuals, and/or monitoring physical movement, a nerve response, a heart rate, and/or blood pressure of the one or more individuals with the explicit knowledge and consent of the one or more individuals.

The process 600 also includes an operation 606 for associating the one or more reactions of the one or more individuals with the content. For example, the one or more reactions may be stored in association to the content on, for example, the device associated with the one or more individuals (e.g., the device 102) and/or a service provider (e.g., the service provider 104). In some cases, the process 600 also includes an operation 608 for selecting one or more sections of the content to be output. The one or more sections of the content may be sections of the content that are associated with a particular type of reaction. In other cases, the process 600 may proceed from the operation 606 to an operation 610 without performing the operation 608.

The process 600 also includes the operation 610 for providing the one or more reactions and the content to be output at a same time to the one or more individuals or one or more other individuals. The one or more reactions and the content may be output via the device associated with the one or more individuals (e.g., the device 102) and/or another device associated with one or more other individuals. In some cases, when the operation 608 is performed, the operation 610 may include providing the one or more sections of the content selected in the operation 608.

In addition, the process 600 includes an operation 612 for obtaining one or more reactions of one or more other individuals while the content and the one or more reactions of the one or more individuals are output to one or more other individuals. Thereafter, the process 600 may return to the operation 606 and associate the obtained one or more reactions from the operation 612 with the content. The process may then perform the operation 608 for selecting one or more sections of the content and the operation 610 for providing the one or more reactions of the one or more other individuals and the content to be output at a same time. In some cases, the content is output to one or more further individuals along with the one or more reactions of the one or more other individuals obtained in the operation 612 and the one or more reactions of the one or more individuals obtained in the operation 604. The operation 612 may then be performed to obtain one or more reactions of the one or more further individuals. In some instances, the process 600 performs the operations 606-612 for a predetermined number of times. Alternatively, or in addition, the process 600 may perform the operation 606-612 until a predetermined number of sections of the content are selected by the operation 608.

Meanwhile, FIG. 7 illustrates the process 700 for providing content, obtaining a reaction to the content, and providing the content and the reaction. The process 700 includes an operation 702 for providing the content to a device, such as device 102. In some instances, the content may be provided by a service provider (e.g., the service provider 104) in a streaming format. The process 700 also includes an operation 704 for outputting the content to one or more individuals via the device. While the content is being output, an operation 706 may be performed for obtaining one or more reactions of the one or more individuals to the content. The operation 706 may be performed by the device associated with the individual (e.g., the device 102).

In addition, the process 700 includes an operation 708 for providing the one or more reactions to the service provider, such as the service provider 104. The process 700 also includes an operation 710 for storing the one or more reactions in association to the content. The operation 710 may be performed by the service provider. Further, the process 700 includes an operation 712 for providing the content and the one or more reactions of the one or more individuals to one or more devices. In some instances, the service provider performs the operation 712 in response to a request from the one or more devices.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A system comprising:
one or more processors;
a rear-facing camera communicatively coupled to the one or more processors and configured to capture content of a surrounding of an individual, the rear-facing camera configured to capture images in a first direction;
a front-facing camera communicatively coupled to the one or more processors and configured to capture a video of the individual in the surrounding of the individual as the rear-facing camera captures the content, the front-facing camera configured to capture images in a second direction that is opposite to the first direction; and
memory accessible by the one or more processors storing a reaction module executable by the one or more processors to perform operations including:
analyzing the video to identify a portion of the video that is associated with a reaction of the individual, the portion of the video being identified without a selection by a user;
associating the reaction of the individual with a section of the content; and
providing the portion of the video associated with the reaction of the individual and the section of the content for display to one or more individuals, the reaction of the individual and the content for display at a same time to the one or more individuals.

2. The system of claim 1, wherein the operations further include capturing audio of the individual, the audio to be included as part of the reaction of the individual.

3. The system of claim 1, wherein the associating includes storing the reaction of the individual as metadata associated with the content.

4. The system of claim 1, wherein the associating includes storing the reaction of the individual and the content on one or more servers accessible to the system over a network.

5. The system of claim 1, the operations further comprising:

causing display of the section of the content along with the portion of the video associated with the reaction of the individual.

6. The system of claim 5, wherein the reaction of the individual is displayed on at least a portion of the content while the content is displayed.

7. The system of claim 1, wherein the providing includes providing an avatar for display which expresses the reaction of the individual.

8. The system of claim 1, wherein the providing comprises providing the portion of the video associated with the reaction of the individual and the section of the content to a social networking site for displaying the reaction of the individual and the section of the content at the same time on the social networking site.

9. The system of claim 1, the operations further comprising:
providing a notification to the individual before capturing the video of the individual, the notification indicating that the individual will be recorded while the content is captured.

10. The system of claim 1, the operations further comprising:
selecting, based at least in part on the reaction of the individual, one or more sections of the content that are associated with a particular type of reaction, the particular type of reaction comprising at least one of a smile, a frown, a head motion, an arm motion, a laugh, a yell, or a cry.

11. One or more computer storage media storing computer-readable instructions that, when executed, instruct one or more processors to perform operations comprising:
causing a computing device to output content to an individual via a display associated with the computing device;
obtaining, by one or more sensors coupled to the one or more processors, data including reactions of the individual to the content while the content is output to the individual, the one or more sensors comprising at least one of:
a forward facing camera to capture a video or image of the individual;
a microphone;
a heart rate monitor;
a blood pressure monitor; or
a gaze tracking sensor;
analyzing the data including the reactions of the individual to identify a particular reaction;
analyzing the content to identify a section of the content that is associated with the particular reaction of the individual and that is associated with a reaction of another individual, the section of the content being identified without receiving a selection by a user; and
causing simultaneous output of the section of the content and at least one of the particular reaction of the individual or the reaction of the other individual.

12. The one or more computer storage media of claim 11, wherein the obtaining the data including the reactions of the individual includes at least one of capturing a video of the individual, capturing audio of the individual, or monitoring a physical response of the individual.

13. The one or more computer storage media of claim 11, wherein the content comprises at least one of video or audio data.

14. The one or more computer storage media of claim 11, wherein analyzing the data including the reactions of the individual to identify the particular reaction comprises identifying at least one of a smile, a frown, a head motion, an arm motion, a laugh, a yell, a cry, a nerve response, a heart rate, or a blood pressure.

15. The one or more computer storage media of claim 11, wherein the section of the content is caused to be output to a further individual that has a similar location, interest, or an age to either the individual or the other individual.

16. A computing device comprising:
one or more processors;
a rear facing camera communicatively coupled to the one or more processors and configured to capture content of an environment of a user, the rear facing camera configured to capture images in a first direction;
one or more sensors communicatively coupled to the one or more processors and configured to capture reactions of the user as the rear facing camera captures the content of the environment; and
memory communicatively coupled to the one or more processors and storing instructions that, when executed by the one or more processors, perform operations including:
analyzing the reactions of the user to identify a section that includes a particular reaction of the user, the section of the video being identified without a selection by an individual;
associating the section of the video with a portion of the content; and
outputting the section of the reactions that includes the particular reaction of the user and the portion of the content for display at a same time to one or more individuals.

17. The computing device of claim 16, the one or more sensors comprising at least one of:
a forward facing camera to capture images in a second direction opposite the first direction;
a microphone;
a heart rate monitor;
a blood pressure monitor; or
a gaze tracking sensor.

18. The computing device of claim 17, wherein analyzing the reactions of the user to identify the section that includes the particular reaction of the user comprises identifying at least one of a smile, a frown, a head motion, an arm motion, a laugh, a yell, a cry, a nerve response, a heart rate, or a blood pressure.

19. The computing device of claim 16, wherein outputting the section of the reactions that includes the particular reaction comprises at least one of:
presenting the section of the reactions that includes the particular reaction of the user and the portion of the content at a same time on a display associated with the computing device; or
sending the section of the reactions that includes the particular reaction of the user and the portion of the content to another computing device to be presented at a same time.

20. The computing device of claim 16, wherein outputting the section of the reactions that includes the particular reaction comprises:
presenting, via a display associated with the computing device, a progress bar representing a duration of a presentation of the reactions; and
presenting, via the display, an indicator on the progress bar at a time corresponding to the section of the reactions that includes the particular reaction.

* * * * *